US012116448B2

(12) United States Patent
Henze et al.

(10) Patent No.: US 12,116,448 B2
(45) Date of Patent: Oct. 15, 2024

(54) POLYURETHANES WITH GOOD PERMEABILITY TO ELECTROMAGNETIC RADIATION

(71) Applicant: BASF SE, Ludwigshafen am Rhein (DE)

(72) Inventors: Oliver Steffen Henze, Lemfoerde (DE); Frank Uhlhorn, Lemfoerde (DE)

(73) Assignee: BASF SE, Ludwigshafen am Rhein (DE)

( * ) Notice: Subject to any disclaimer, the term of this patent is extended or adjusted under 35 U.S.C. 154(b) by 307 days.

(21) Appl. No.: 16/626,679

(22) PCT Filed: Jun. 27, 2018

(86) PCT No.: PCT/EP2018/067215
§ 371 (c)(1),
(2) Date: Dec. 26, 2019

(87) PCT Pub. No.: WO2019/002350
PCT Pub. Date: Jan. 3, 2019

(65) Prior Publication Data
US 2020/0157272 A1    May 21, 2020

(30) Foreign Application Priority Data
Jun. 27, 2017   (EP) .................................... 17178008

(51) Int. Cl.
C08G 18/44 (2006.01)
C08G 18/73 (2006.01)
C08G 18/76 (2006.01)
H01B 3/30 (2006.01)
H01Q 1/52 (2006.01)
C08G 18/22 (2006.01)
C08K 7/14 (2006.01)

(52) U.S. Cl.
CPC ............. C08G 18/44 (2013.01); C08G 18/73 (2013.01); C08G 18/7671 (2013.01); H01B 3/30 (2013.01); H01B 3/302 (2013.01); H01Q 1/526 (2013.01); C08G 18/222 (2013.01); C08K 7/14 (2013.01)

(58) Field of Classification Search
CPC ................................ H01B 3/302; C08G 18/44
See application file for complete search history.

(56) References Cited
U.S. PATENT DOCUMENTS

| 2003/0144362 | A1 | 7/2003 | Utterberg et al. |
| 2004/0192875 | A1 | 9/2004 | Kiso et al. |
| 2007/0027288 | A1 | 2/2007 | Matsuda et al. |
| 2007/0219282 | A1 | 9/2007 | Harre et al. |
| 2014/0088246 | A1* | 3/2014 | Morikami ............. C08G 18/44 |
| | | | 524/591 |
| 2015/0284501 | A1* | 10/2015 | Wamprecht ........ C08G 18/3206 |
| | | | 528/58 |
| 2015/0342276 | A1* | 12/2015 | Yamasaki .......... C08G 18/7843 |
| | | | 428/221 |
| 2017/0002199 | A1 | 1/2017 | Henze et al. |

FOREIGN PATENT DOCUMENTS

| DE | 4015714 A1 * | 11/1991 | ............... C08J 9/00 |
| DE | 10 2012 218 848 A1 | 4/2014 | |
| EP | 0 989 146 A1 | 3/2000 | |
| EP | 1 460 094 A1 | 9/2004 | |
| EP | 1 529 792 A1 | 5/2005 | |
| JP | 2005-178211 | 7/2005 | |
| JP | 2016074750 A * | 5/2016 | ............. B32B 27/40 |
| KR | 20110008887 A * | 1/2011 | ............. C08G 18/08 |
| WO | 2004/106401 | 12/2004 | |
| WO | WO 2006/034800 A1 | 4/2006 | |

OTHER PUBLICATIONS

JP-2016074750-A_05-2016_English Translation.*
KR-20110008887_01-2011_English Translation.*
DE-4015714_11-1991_English Translation.*
International Search Report issued on Sep. 24, 2018 in PCT/EP2018/067215 (with English translation), 5 pages.
International Preliminary Report on Patentability issued on Oct. 11, 2019 in PCT/EP2018/067215 filed Jun. 27, 2018 (with English translation), 19 pages.
Written Opinion of the International Searching Authority issued on Sep. 24, 2018 in PCT/EP2018/067215 filed Jun. 27, 2018 (with English translation), 10 pages.
"Polyurethane, Kunststoff Handbuch" Carl Hanser Verlag, 3rd edition, Chapter 5, vol. 7, 1993, 74 pages.
"Polyurethane, Kunststoff Handbuch" Carl Hanser Verlag, 3rd edition, Chapter 6, vol. 7, 1993, 89 pages.
"Polyurethane, Kunststoff Handbuch" Carl Hanser Verlag, 1993, chapter 3.2 and chapter 3.4 and chapter 6.1, 44 pages.
"Polyurethane, Kunststoff Handbuch" Carl Hanser Verlag, 3rd Edition, Chapter 3.1, vol. 7, 1993, 19 pages.
Frederick T. Wallenberger, et al. "Glass Fibers" PPG Industries, Inc, ASM International, vol. 21: Composites, 2001, pp. 27-34.
Hans Zweifel, et al., "Plastics Additives Handbook" Hanser, 5th edition, 2001, pp. 98-136.

(Continued)

Primary Examiner — Michael L Leonard
(74) Attorney, Agent, or Firm — Grüneberg and Myers PLLC

(57) ABSTRACT

The invention provides articles made of thermoplastic polyurethane based on polycarbonate diol which are a constituent of a device that receives or transmits electromagnetic radiation, are a cover for a device, or are used in proximity to such a device. The invention further provides for the use of thermoplastic polyurethane based on polycarbonate diol for these articles.

19 Claims, No Drawings

(56) References Cited

OTHER PUBLICATIONS

U.S. Appl. No. 16/626,123, filed Dec. 23, 2019, Mark Ottens, et al.
Japanese Office Action dated Apr. 26, 2022 in Japanese Application No. 2019-572662, with English translation, 8 pages.
Kamemura Toshihisa, "RFID", The Journal, Nov. 2021, pp. 850-853.

* cited by examiner

POLYURETHANES WITH GOOD PERMEABILITY TO ELECTROMAGNETIC RADIATION

The present invention provides polyurethane that is particularly suitable for use in proximity to or in devices which transmit or receive electromagnetic radiation.

Plastics are commonly used in and on electronic devices which transmit or receive electromagnetic radiation. In some cases substantial parts of the device itself are produced from plastic or the device is for example surrounded with protective plastic. The devices are also often provided with peripherals, for example a holder, or articles made of plastic are employed in direct proximity to the device, for example stands, shelves, covers and the like. All of these articles absorb electromagnetic radiation which results in reduced performance of the device.

These materials must also meet very different profiles of requirements, but must predominantly satisfy high mechanical demands of very different types.

The present invention accordingly has for its object to provide plastics specifically for articles which have a high mechanical resilience with a very different profile of requirements such as for example impact strength at low temperatures, high elasticity, particular haptics and/or a high tear propagation resistance while simultaneously attenuating electromagnetic radiation less than known materials.

It has now been found that, surprisingly, polyurethanes, preferably thermoplastic polyurethanes, based on polycarbonates not only satisfy the very different profile of mechanical requirements for the recited articles but simultaneously also absorb electromagnetic radiation to an extent that is markedly reduced compared to the plastics typically used for these devices.

The present invention therefore provides an article made of polyurethane, preferably made of thermoplastic polyurethane, which is a constituent of a device or a cover for a device or which is used in proximity to a device, wherein the device receives or transmits electromagnetic radiation and the polyurethane is produced from at least one isocyanate and at least one isocyanate-reactive substance having a number-average molecular weight of more than $0.500 \times 10^3$ g/mol, wherein the isocyanate-reactive substance comprises at least one polycarbonate having at least two hydroxyl groups.

"Polyurethane" in the context of the invention comprises all known polyisocyanate polyaddition products. These comprise addition products of isocyanate and alcohol and modified polyurethanes which may comprise isocyanurate, allophanate, urea, carbodiimide, uretonimine and biuret structures and further isocyanate addition products. These polyurethanes according to the invention comprise in particular solid polyisocyanate polyaddition products, such as duromers, and foams based on polyisocyanate-polyaddition products, such as flexible foams, semi-rigid foams, rigid foams or integral foams and also polyurethane coatings and binders, especially also thermoplastic polyurethanes, pellets thereof and expanded pellets. Expanded pellets are small foam spheres.

The polyurethanes according to the invention are preferably polyurethane foams or solid polyurethanes which contain no further polymers in addition to the polyurethane units elucidated hereinbelow.

The polyurethanes are based on the components (a) isocyanate, (b) isocyanate-reactive compounds, also referred to as polyol, and in preferred embodiments (c) chain extenders, optionally (e) catalysts and optionally (d) auxiliary and/or additive substances.

The components (a) isocyanate, (b) isocyanate-reactive compounds, also referred to as polyol, and (c) chain extenders are also referred to individually or collectively as synthesis components. The synthesis components together with the catalyst and/or the customary auxiliary and/or additive substances are also referred to as input materials.

In the context of the invention the term "polyurethane foams" is to be understood as meaning foams according to DIN 7726. Flexible polyurethane foams according to the invention have a compressive stress at 10% compression/compressive strength according to DIN 53 421/DIN EN ISO 604 of 15 kPa or less, preferably 1 to 14 kPa and in particular 4 to 14 kPa. Semi-rigid polyurethane foams according to the invention have a compressive stress at 10% compression according to DIN 53 421/DIN EN ISO 604 of from more than 15 to less than 80 kPa. According to DIN ISO 4590 semi-rigid polyurethane foams and flexible polyurethane foams according to the invention have an open-cell content of preferably more than 85%, particularly preferably more than 90%. Further details about flexible polyurethane foams and semi-rigid polyurethane foams according to the invention may be found in "Kunststoffhandbuch", Volume 7, "Polyurethane", Carl Hanser Verlag, 3rd edition 1993, chapter 5.

The rigid polyurethane foams according to the invention exhibit a compressive stress at 10% compression of not less than 80 kPa, preferably not less than 120 kPa, particularly preferably not less than 150 kPa. Furthermore, the rigid polyurethane foam has a closed-cell content of more than 80%, preferably more than 90%, according to DIN ISO 4590. Further details about rigid polyurethane foams according to the invention may be found in "Kunststoffhandbuch", Volume 7, "Polyurethane", Carl Hanser Verlag, 3rd edition 1993, chapter 6.

In the context of the present invention "elastomeric polyurethane foams" is to be understood as meaning polyurethane foams according to DIN 7726 which after brief deformation by 50% of their thickness according to DIN 53 577 show no lasting deformation above 2% of their starting thickness after 10 minutes. A rigid polyurethane foam, a semi-rigid polyurethane foam or a flexible polyurethane foam may be concerned.

"Integral polyurethane foams" is to be understood as meaning polyurethane foams according to DIN 7726 having an edge zone that has a higher density than the core as a consequence of the molding process. The overall apparent density averaged over the core and the edge zone is preferably more than 100 g/L. In the context of the present invention integral polyurethane foams may also be rigid polyurethane foams, semi-rigid polyurethane foams or flexible polyurethane foams. Further details about integral polyurethane foams according to the invention may be found in c.

The polyurethanes according to the invention are obtained by mixing polyisocyanates (a), isocyanate-reactive compounds (b), optionally with chain extender (c), optionally catalysts (d) and optionally blowing agents (e) and further auxiliary and additive substances (f) together to form a reaction mixture and reacting said mixture.

In a preferred embodiment the polyurethane according to the invention is a polyurethane foam having an average density of 20 g/L to $0.85 \times 10^3$ g/L, preferably a semi-rigid polyurethane foam or a flexible polyurethane foam or a rigid polyurethane foam, particularly preferably an elastomeric flexible polyurethane foam, a semi-rigid polyurethane foam or an elastomeric integral polyurethane foam. The elastomeric integral polyurethane foam preferably has a density averaged over the core and the edge zone of $0.15 \times 10^3$ g/L to $0.5 \times 10^3$ g/L. The flexible polyurethane foam preferably has an average density of $0.01 \times 10^3$ g/L to $0.1 \times 10^3$ g/L. The semi-rigid polyurethane foam preferably has an average density of $0.07 \times 10^3$ g/L to $0.15 \times 10^3$ g/L.

In a further preferred embodiment the polyurethane is a solid polyurethane having a density of preferably more than $0.85 \times 10^3$ g/L, preferably $0.9 \times 10^3$ g/L to $1.4 \times 10^3$ g/L and particularly preferably $1.0 \times 10^3$ g/L to $1.3 \times 10^3$ g/L. A solid polyurethane is obtained essentially without addition of a blowing agent. Small amounts of blowing agent, for example water, present in the polyols as a consequence of production are not considered blowing agents here. The reaction mixture for producing the compact polyurethane preferably contains less than 0.2% by weight, particularly preferably less than 0.1% by weight and in particular less than 0.05% by weight, of water.

The isocyanate components (a) used for producing the polyurethanes according to the invention comprise all isocyanates known for the production of polyurethanes. These comprise the aliphatic, cycloaliphatic and aromatic divalent or polyvalent isocyanates known from the prior art and any desired mixtures thereof. Examples include 2,2'-, 2,4'- and 4,4'-diphenylmethane diisocyanate, the mixtures of monomeric diphenylmethane diisocyanates and higher nuclear homologs of diphenylmethane diisocyanate (polymeric MDI), isophorone diisocyanate (IPDI) or its oligomers, 2,4- or 2,6-tolylene diisocyanate (TDI) or mixtures thereof, tetramethylene diisocyanate or its oligomers, hexamethylene diisocyanate (HDI) or its oligomers, naphthylene diisocyanate (NDI) or mixtures thereof.

In a preferred embodiment, the isocyanate is selected from the group consisting of 4,4'-, 2,4'- and 2,2'-dicyclohexylmethane diisocyanate (H12 MDI), 1,6-hexamethylene diisocyanate (HDI), 1,4-cyclohexane diisocyanate, 1-methyl-2,4- and/or -2,6-cyclohexane diisocyanate, 2,2'-, 2,4'- and/or 4,4'-diphenylmethane diisocyanate (MDI), 2,4- and/or 2,6-tolylene diisocyanate (TDI). Particular preference is given to 4,4'-diphenylmethane diisocyanate (MDI) and 1,6-hexamethylene diisocyanate (HDI). HDI is preferred for its good UV stability in conjunction with excellent mechanical properties.

In applications where light stability is not necessary, for example when using light-shielded components, such as frames of devices, it is preferable to employ 2,2'-, 2,4'- and/or 4,4'-diphenylmethane diisocyanate (MDI) since it has the better mechanical properties.

H12 MDI is the isocyanate preferably used for transparent polyurethanes, in particular for transparent TPU.

Another preferred embodiment employs 2,4- and/or 2,6-tolylene diisocyanate (TDI) or mixtures thereof, monomeric diphenylmethane diisocyanates and/or higher nuclear homologs of diphenylmethane diisocyanate (polymeric MDI) and mixtures thereof.

Further possible isocyanates are recited for example in "Polyurethane Handbook, Hanser, Munich, $2^{nd}$ edition 1993, chapter 3.2 and further chapters".

The isocyanate component (a) may be employed in the form of isocyanate prepolymers. These isocyanate prepolymers are obtainable by reacting an excess of the abovementioned isocyanates (constituent (a)) with polymeric compounds having isocyanate-reactive groups (b) and in a preferred embodiment with chain extenders (c) for example at temperatures of 30° C. to 100° C., preferably at about 80° C., to afford the isocyanate prepolymer.

The isocyanate-reactive compounds (b) having a number-average molecular weight of more than 500 g/mol and chain extenders (c) having a number-average molecular weight between 50 g/mol and 499 g/mol are known to those skilled in the art and described for example in "Kunststoffhandbuch, 7, Polyurethane", Carl Hanser-Verlag, 3rd edition 1993, chapter 3.1.

Employed as the isocyanate-reactive compounds (b) is at least one polycarbonate diol, preferably an aliphatic polycarbonate diol having a number-average molecular weight of more than $0.500 \times 10^3$ g/mol. Preferred polycarbonate diols are polycarbonate diols based on alkanediols. Particularly suitable polycarbonate diols are strictly difunctional OH-functional polycarbonate diols, preferably strictly difunctional OH-functional aliphatic polycarbonate diols. Suitable polycarbonate diols are for example based on butanediol, pentanediol or hexanediol, especially 1,4-butanediol, 1,5-pentanediol, 1,6-hexanediol, 3-methylpentane-(1,5)-diol or mixtures thereof, particularly preferably 1,4-butanediol, 1,5-pentanediol, 1,6-hexanediol or mixtures thereof. Preferably employed in the context of the present invention are polycarbonate diols based on butanediol and hexanediol, polycarbonate diols based on pentanediol and hexanediol, polycarbonate diols based on hexanediol and mixtures of two or more of these polycarbonate diols.

The employed polycarbonate diols preferably have a number-average molecular weight Mn in the range from 500 g/mol to $4.0 \times 10^3$ g/mol determined by GPC. It is more preferable when the number-average molecular weight Mn of the polycarbonate diol is in the range from $0.65 \times 10^3$ g/mol to $3.5 \times 10^3$ g/mol and particularly preferably in the range from $0.8 \times 10^3$ g/mol to $3.0 \times 10^3$ g/mol determined by GPC.

It is preferable when the polycarbonate diol is an aliphatic polycarbonate diol. In another preferred embodiment the polycarbonate diol is based on diols selected from the group of butanediol, pentanediol or hexanediol.

It is preferable when the employed polycarbonate diols have a number-average molecular weight Mn in the range from 500 g/mol to $4.0 \times 10^3$ g/mol determined by GPC, preferably in the range from $0.65 \times 10^3$ g/mol to $3.5 \times 10^3$ g/mol, particularly preferably in the range from $0.8 \times 10^3$ g/mol to $3.0 \times 10^3$ g/mol.

Also employable in the isocyanate-reactive compound (b) are further known compounds having at least two isocyanate-reactive hydrogen atoms, for example those having a functionality of 2 to 8 and a number-average molecular weight of 500 g/mol to $15 \times 10^3$ g/mol.

In a preferred embodiment the isocyanate-reactive substance comprises more than 50% by weight of polycarbonate having at least two hydroxyl groups, more preferably more than 75% by weight, more preferably more than 90% by weight, yet more preferably more than 95% by weight and particularly preferably more than 99% by weight. The % by weight values are based on the total isocyanate-reactive substance having a number-average molecular weight of more than $0.500 \times 10^3$ g/mol.

When further isocyanate-reactive substances (c) are used these are preferably polyethers since this brings about a reduced soiling tendency of the articles.

Chain Extenders (c)

Production of the polyurethane employs a further aliphatic, araliphatic, aromatic or cycloaliphatic compound having isocyanate-reactive groups and a molecular weight between 50 g/mol and 499 g/mol which is also referred to as chain extender (c), wherein the chain extender preferably has only primary hydroxyl groups.

Employed as chain extenders or crosslinkers (c) in preferred embodiments are compounds having at least two isocyanate-reactive groups and a molecular weight of less than 500 g/mol, wherein molecules having two isocyanate-reactive hydrogen atoms are also referred to as chain extenders and molecules having more than two isocyanate-reactive groups are also referred to as crosslinkers. Chain extenders and/or crosslinking agents are used for modifying the mechanical properties, for example hardness.

In certain preferred embodiments the chain extender and/or the crosslinking agent are eschewed.

When chain extenders and/or crosslinking agents (c) are employed, the chain extenders and/or crosslinkers known from the production of polyurethanes may be employed. These are preferably low molecular weight compounds, preferably having a molecular weight between 50 g/mol and 499 g/mol, comprising isocyanate-reactive groups, for example glycerol, trimethylolpropane, glycol and diamines. Further possible low molecular weight chain extenders and/or crosslinking agents are recited for example in Polyurethane Handbook, Hanser, Munich, $2^{nd}$ edition 1993, chapter 3.4.3.

The chain extenders 1,2-ethanediol, 1,3-propanediol, 1,4-butanediol are particularly preferred and 1,4-butanediol is very particularly preferred.

Auxiliary and/or additive substances (f) may also be employed. Any auxiliary and additive substances known for the production of polyurethanes may be used. These include for example surface-active substances, foam stabilizers, nucleating agents, oxidation stabilizers, cell regulators, release agents, lubricating and demolding agents, fillers, dyes, pigments, flame retardants, optionally stabilizers, preferably against hydrolysis, light, heat or discoloration, inorganic and/or organic fillers, reinforcers and/or plasticizers, fungistatic and bacteriostatic substances. The auxiliary and/or additive substances are chosen such that they are readily permeable to the electromagnetic waves in the recited preferred ranges, i.e. preferably have only a very small dipole moment, if any.

Such substances are known and recited for example in "Polyurethane Handbook, Hanser, Munich, $2^{nd}$ edition 1993, chapter 3.4". Stabilizers in the context of the present invention are additives which protect a plastic or a plastic mixture against harmful environmental influences. Examples include primary and secondary antioxidants, sterically hindered phenols, hindered amine light stabilizers, UV absorbers, hydrolysis stabilizers, quenchers and flame retardants. Examples of commercially available stabilizers may be found in Plastics Additives Handbook, 5th edn., H. Zweifel, ed., Hanser, Munich, 2001 ([1]), pp. 98-136.

In a preferred embodiment the UV absorbers have a number-average molecular weight of greater than $0.3\times10^3$ g/mol, in particular greater than $0.39\times10^3$ g/mol. Furthermore the preferably employed UV absorbers should have a molecular weight of not more than $5\times10^3$ g/mol, particularly preferably of not more than $2\times10^3$ g/mol.

Particularly suitable UV absorbers are the group comprising cinnamates, oxanilides and benzotriazoles, particular preference being given to benzotriazoles. Examples of particularly suitable benzotriazoles are Tinuvin® 213, Tinuvin® 234, Tinuvin® 571 and also Tinuvin® 384 and Eversorb®82.

The UV absorbers are typically added in amounts of 0.01% by weight to 5% by weight based on the total mass of TPU, preferably 0.1% by weight to 2.0% by weight, in particular 0.2% by weight to 0.5% by weight.

A UV stabilization based on an antioxidant and a UV absorber as described above is often not yet sufficient to ensure a good stability of the TPU according to the invention against the damaging effect of UV radiation. In this case a hindered amine light stabilizer (HALS) may still be added to the TPU according to the invention in addition to the antioxidant and the UV absorber. The activity of the HALS compounds is based on their ability to form nitroxyl radicals which interfere in the mechanism for oxidation of polymers. HALS are highly efficient UV stabilizers for most polymers.

HALS compounds are common knowledge and commercially available. Examples of commercially available HALS stabilizers may be found in Plastics Additives Handbook, 5th edition, H. Zweifel, Hanser, Munich, 2001, pages 123-136.

Preferably employed hindered amine light stabilizers are hindered amine light stabilizers having a number-average molecular weight greater than 500 g/mol. Furthermore, the preferred HALS compounds should have a molecular weight of not more than $10\times10^3$ g/mol, particularly preferably not more than $5\times10^3$ g/mol.

Particularly preferred hindered amine light stabilizers are bis(1,2,2,6,6-pentamethylpiperidyl) sebacate (Tinuvin® 765, Ciba Spezialitätenchemie AG) and the condensation product of 1-hydroxyethyl-2,2,6,6-tetramethyl-4-hydroxypiperidine and succinic acid (Tinuvin® 622). Especial preference is given to the condensation product of 1-hydroxyethyl-2,2,6,6-tetramethyl-4-hydroxypiperidine and succinic acid (Tinuvin® 622) when the titanium content of the finished product is less than 150 ppm, preferably less than 50 ppm, in particular less than 10 ppm, based on the employed synthesis components.

HALS compounds are preferably employed in a concentration of 0.01% by weight to 5% by weight, particularly preferably of 0.1% by weight to 1% by weight, in particular of 0.15% by weight to 0.3% by weight, based on the total weight of the thermoplastic polyurethane based on the employed synthesis components.

A particularly preferred UV stabilization comprises a mixture of a phenolic stabilizer, a benzotriazole and a HALS compound in the above-described preferred amounts.

In preferred embodiments the polyurethanes according to the invention contain fillers. The chemical nature and the form of the filler can vary widely, as long as there is sufficient compatibility with the polyurethane and at the same time the permeability to electromagnetic radiation is ensured.

Suitable fillers are for example glass fibers, glass beads, carbon fibers, aramid fibers, potassium titanate fibers, fibers of liquid-crystal polymers, organic fibrous fillers or inorganic reinforcing materials. Organic fibrous fillers are for example cellulose fibers, hemp fibers, sisal or kenaf. Inorganic reinforcing materials are for example ceramic fillers, such as aluminum and boron nitride, or mineral fillers, such as asbestos, talc, wollastonite, microvit, silicates, chalk, calcined kaolins, mica and quartz flour.

Fibrous fillers are preferred in the context of the present invention. The fibers preferably have a diameter of 3 μm to 30 μm, preferably 6 μm to 20 μm and particularly preferably from 8 μm to 15 μm. The fiber length in the polyurethane is generally 20 μm to 1000 μm, preferably 180 μm to 500 μm and particularly preferably 200 μm to 400 μm.

The fibrous fillers may be surface-pretreated with a silane compound to improve compatibility with the thermoplastic.

It is preferable to employ inorganic fibrous fillers. When using inorganic fibrous fillers, a greater reinforcing effect on the polymer and a higher heat resistance are observed.

Particularly preferred inorganic fibers for the present invention are coated glass fibers, more preferably made of E-glass. E-glass is borosilicate glass for demanding electrical applications, see in this respect also "Glass Fibers, Frederick T. Wallenberger, James C. Watson, and Hong Li, PPG Industries, Inc.; ASM Handbook, Vol. 21: Composites". The glass fibers, preferably made of E-glass, further preferably have a thickness of 3 µm to 30 µm, in particular 8 µm to 15 µm and further preferably have a maximum fiber length distribution in the range from 0.03 mm to about 15 mm, in particular from 1 mm to 10 mm, and are produced according to the prior art.

According to the invention the polyurethane may also comprise 2 or more fillers.

The proportion of the filler in the polyurethane is preferably in the range from 10% by weight to 50% by weight based on the employed polyurethane, more preferably in the range from 20% by weight to 45% by weight, particularly preferably in the range from 25% by weight to 40% by weight.

Further details concerning the abovementioned auxiliary and additive substances may be found in the technical literature, for example in Plastics Additives Handbook, 5th edition, H. Zweifel, ed., Hanser, Munich, 2001.

Production

In the production of the polyurethane according to the invention the polyisocyanates (a), the polyols (b), chain extenders and/or crosslinking agents (c), optionally catalyst (d) and, where employed, the blowing agents (e) and optionally auxiliary and/or additive substances (f) are generally reacted in amounts such that the equivalence ratio of NCO groups of the polyisocyanates (a) to the sum of the reactive hydrogen atoms of the components (b), (c), (d), (e) and (f) is 0.75 to 1.5:1, preferably 0.80 to 1.25:1. If the cellular plastics at least partially comprise isocyanurate groups, a ratio of NCO groups of the polyisocyanates (a) to the sum of the reactive hydrogen atoms of the components (b), (c), (d), (e) and (f) of 1.5 to 20:1, preferably 1.5 to 8:1, is typically used. A ratio of 1:1 corresponds here to an isocyanate index of 100.

Chain Extenders (c)

Catalysts d) accelerate the reaction of the polyols (b) and optionally chain extenders and crosslinking agents and chemical blowing agent with the organic, optionally modified polyisocyanates (a).

Catalysts (d) are preferably also employed to produce the polyurethanes. Preference is given to amidines, such as 2,3-dimethyl-3,4,5,6-tetrahydropyrimidine, tertiary amines, such as triethylamine, tributylamine, dimethylbenzylamine, N-methyl-, N-ethyl- and N-cyclohexylmorpholine, N,N,N', N'-tetramethylethylenediamine, N,N,N',N'-tetramethylbutanediamine, N,N,N',N'-tetramethylhexanediamine, pentamethyldiethylenetriamine, tetramethyldiaminoethyl ether, bis(dimethylaminopropyl)urea, dimethylpiperazine, 1,2-dimethylimidazole, 1-azabicyclo-(3,3,0)-octane, 1,8-diazabicyclo-(5,4,0)-undec-7-ene, and preferably 1,4-diazabicyclo-(2,2,2)-octane. Another likewise preferred group of catalysts (d) are organic metal compounds, preferably organic tin compounds, such as tin(II) salts of organic carboxylic acids, for example tin(II) acetate, tin(II) octoate, tin(II) ethylhexoate and tin(II) laurate, and the dialkyltin(IV) salts of organic carboxylic acids, for example dibutyltin diacetate, dibutyltin dilaurate, dibutyltin maleate and dioctyltin diacetate, titanate esters, and also bismuth carboxylates, such as bismuth(III) neodecanoate, bismuth 2-ethylhexanoate and bismuth octanoate, or mixtures thereof. The organic metal compounds are employed alone or preferably in combination with strongly basic amines.

If the isocyanate-reactive component (b) is an ester it is preferable to employ exclusively amine catalysts.

When the polyurethanes are thermoplastic polyurethanes it is preferable to employ the organic metal compounds recited above with the preference recited there. In the case of thermoplastic polyurethanes it is more preferable to employ an organic metal compound as the catalyst.

Further preferred examples are the catalysts for thermoplastic polyurethanes selected from the group of tin dioctoate, bismuth decanoate and titanate esters. These catalysts have the advantage that the polyurethanes can still be ripened, in particular even after underwater granulation. Tin dioctoate is particularly preferred.

When catalysts (d) are employed they are preferably employed in a concentration of 0.001% by weight to 5% by weight, in particular 0.05% by weight to 2% by weight, as a catalyst/catalyst combination based on the weight of the component (b).

Blowing Agent (e)

When the polyurethane according to the invention is to be in the form of a polyurethane foam reaction mixtures according to the invention further contain blowing agent (e). Any blowing agents known for the production of polyurethanes may be employed. These may comprise chemical and/or physical blowing agents. Such blowing agents are described for example in "Polyurethane Handbook, Hanser, Munich, $2^{nd}$ edition 1993, chapter 3.4.5". "Chemical blowing agents" is understood to mean compounds that form gaseous products by reaction with isocyanate. Examples of such blowing agents are water or carboxylic acids. "Physical blowing agents" is understood to mean compounds that are dissolved or emulsified in the input materials of polyurethane production and vaporize under the conditions of polyurethane formation. Examples thereof include hydrocarbons, halogenated hydrocarbons and other compounds, for example perfluorinated alkanes such as perfluorohexane, chlorofluorohydrocarbons, and ethers, esters, ketones, acetals and/or liquid carbon dioxide. The blowing agent may be employed in any desired amount. The blowing agent is preferably employed in an amount such that the resulting polyurethane foam has a density of 10 to 850 g/L, particularly preferably 20 to 800 g/L and in particular 25 to 500 g/L. It is particularly preferable to employ blowing agents comprising water.

The specific starting substances (a) to (f) for producing polyurethanes according to the invention in each case differ quantitatively and qualitatively only to a small extent when the inventive polyurethane to be produced is a thermoplastic polyurethane, a flexible foam, a semi-rigid foam, a rigid foam or an integral foam. Thus, for example, the production of solid polyurethanes employs no blowing agents and the production of thermoplastic polyurethane employs predominantly strictly difunctional starting substances. Furthermore, the elasticity and hardness of the polyurethane according to the invention may be varied for example via the functionality and the chain length of the higher molecular weight compound having at least two reactive hydrogen atoms. Such modifications are known to those skilled in the art. The reactants for producing a solid polyurethane are described for example in EP 0989146 or EP 1460094, the reactants for producing a flexible foam for example in PCT/EP2005/010124 and EP 1529792, the reactants for producing a semi-rigid foam for example in "Polyurethane Handbook, Hanser, Munich, 2$^{nd}$ edition 1993, chapter 6.1", the reactants for producing a rigid foam for example in PCT/EP2005/010955 and the reactants for producing an integral foam for example in EP 364854, U.S. Pat. No. 5,506,275 or EP 897402. The organosulfur compound (d) is then added to the reactants described in these documents in each case.

TPU

In a preferred embodiment the polyurethane is a thermoplastic polyurethane. Production is carried out by reaction of (a) isocyanates with (b) isocyanate-reactive compounds, also referred to as polyols, having a number-average molecular weight of $0.5 \times 10^3$ g/mol to $100 \times 10^3$ g/mol and in more preferred embodiments with (c) chain extenders having a molecular weight of $0.05 \times 10^3$ g/mol to $0.499 \times 10^3$ g/mol, in more preferred embodiments in the presence of (d) catalysts and/or (e) customary auxiliary and/or additive substances.

To adjust the hardness and melt index of the TPU the employed amounts of synthesis components (b) and (c) may be varied in their molar ratios, wherein hardness and melt viscosity increase with increasing content of chain extender (c) while melt index decreases.

To produce the preferred thermoplastic polyurethanes according to the invention it is preferable to use substantially difunctional polyols (b), also referred to as polyhydroxyl compounds (b), which according to the invention are the above-described polycarbonates, and the chain extenders (c) advantageously in molar ratios of 1:1 to 1:5, preferably 1:1.5 to 1:4.5, so that the resulting mixtures of the synthesis components (b) and (c) have a hydroxyl equivalent weight of more than 200, and in particular of 230 to 450, while to produce relatively hard TPU, for example having a Shore A hardness of more than 98, preferably of 55 to 75 Shore D, the molar ratios of (b):(c) are in the range from 1:5.5 to 1:15, preferably from 1:6 to 1:12 so that the obtained mixtures of (b) and (c) have a hydroxyl equivalent weight of 110 to 200, preferably of 120 to 180.

To produce the TPUs according to the invention the synthesis components (a), (b), and in a preferred embodiment also (c), are reacted in the presence of a catalyst (d) and optionally auxiliary and/or additive substances (e) in amounts such that the equivalence ratio of NCO groups of the diisocyanates (a) to the sum of the hydroxyl groups in the components (b) and (c) is 0.95:1 to 1.10:1, preferably 0.98:1 to 1.02:1 and in particular 0.99 to 1.00:1.

Preferably produced according to the invention are TPUs where the TPU has a weight-average molecular weight of $0.08 \times 10^6$ g/mol to $0.8 \times 10^6$ g/mol, preferably from $0.1 \times 10^6$ g/mol to $0.18 \times 10^6$ g/mol. The upper limit for the weight-average molecular weight of the TPUs is generally determined by the processability, and also the spectrum of properties desired. The average molecular weights reported hereinabove for the TPU as well as for the synthesis components (a) and (b) are the weight averages determined by gel permeation chromatography.

The above-described isocyanates are also employed as organic isocyanates (a) for thermoplastic polyurethanes.

The isocyanate-reactive compound (b) has on statistical average at least 1.8 and at most 3.0 Zerewitinoff-active hydrogen atoms for thermoplastic polyurethanes, this number also being referred to as the functionality of the isocyanate-reactive compound (b) and indicating the amount of isocyanate-reactive groups in the molecule theoretically calculated for one molecule from an amount of substance. The functionality is preferably between 1.8 and 2.6, more preferably between 1.9 and 2.2 and in particular 2.

The isocyanate-reactive compound, the polycarbonate according to the invention, is described hereinabove with the relevant preference.

These long-chain compounds are employed in an amount of substance ratio of 1 equivalent mol % to 80 equivalent mol % based on the isocyanate group content of the polyisocyanate.

Preferably employed as chain extenders (c) for TPU are aliphatic, araliphatic, aromatic and/or cycloaliphatic compounds having a molecular weight of 50 g/mol to 499 g/mol, preferably having 2 isocyanate-reactive compounds, which are also referred to as functional groups. Preferred chain extenders are diamines and/or alkanediols, more preferably alkanediols having 2 to 10 carbon atoms, preferably having 3 to 8 carbon atoms in the alkylene radical, which more preferably have only primary hydroxyl groups.

It is preferable when the chain extender (c) for TPU is at least one chain extender selected from the group consisting of 1,2-ethylene glycol, 1,2-propanediol, 1,3-propanediol, butane-1,4-diol, butane-2,3-diol, pentane-1,5-diol, hexane-1,6-diol, diethylene glycol, dipropylene glycol, 1,4-cyclohexanediol, 1,4-dimethanolcyclohexane, neopentyl glycol and hydroquinone bis(2-hydroxyethyl) ether (HQEE). Particularly suitable chain extenders are those selected from the group consisting of 1,2-ethylene glycol, propane-1,3-diol, butane-1,4-diol and hexane-1,6-diol.

More preferred chain extenders are butane-1,4-diol, hexane-1,6-diol and ethanediol, in particular butane-1,4-diol.

For the thermoplastic polyurethanes too, in preferred embodiments the above-described catalysts, auxiliaries and fillers are employed with the above-described preferences and amounts.

TPU Production

The TPUs may be produced discontinuously or continuously by the known processes, for example using reactive extruders or the belt process by the "one-shot" process or the prepolymer process, preferably by the "one-shot" process. In the "one-shot" process the to-be-reacted components (a), (b), and in preferred embodiments also the components (c), (d) and/or (e), are mixed with one another consecutively or simultaneously, resulting in immediate commencement of the polymerization reaction. In the extruder process the synthesis components (a), (b), and in preferred embodiments also (c), (d) and/or (e), are introduced into the extruder individually or as a mixture and brought to reaction preferably at temperatures of 100° C. to 280° C., preferably 140° C. to 250° C. The obtained polyurethane is extruded, cooled and pelletized.

Production

Production of polyurethanes is typically carried out by means of the prepolymer process in which the isocyanate (a) is produced in an equimolar ratio with the isocyanate-reactive compound (b). This prepolymer is reacted in a second step with further polyol (b), optionally chain extender (c) and optionally also further input materials (d) and/or (e) to afford the polyurethane:

In a preferred process thermoplastic polyurethane is produced in one step from the synthesis components isocyanate (a), the isocyanate-reactive compound (b), chain extenders (c) and in preferred embodiments the further input materials (d) and/or (e).

It is preferable to use a twin-screw extruder, because the twin-screw extruder operates in force-conveying mode and thus permits greater precision of adjustment of the temperature and quantitative output in the extruder.

In another preferred process thermoplastic polyurethane is also produced with the above-described prepolymer process.

The above-described thermoplastic polyurethanes are processed into pellets or powder preferably used for producing injection molded, calendered, powder-sintered or extruded articles.

Thermoplastic polyurethane is in particular employed in a hardness range of 30 Shore A to 80 Shore D. In the context of the present invention a glass fiber-reinforced thermoplastic polyurethane preferably has a hardness in the range from 30 Shore A to 80 Shore D.

Preferred thermoplastic polyurethanes have an elastic modulus measured according to EN ISO 527-1 of 50 MPa to 20 000 MPa, preferably 500 MPa to 18 000 MPa, particularly preferably 10 000 MPa to 15 000 MPa.

It is preferable to employ materials which allow simple processing for example by injection molding. It is important that these materials allow precise reproduction of the surface textures of the relevant injection mold.

In certain embodiments it is advantageous for the polyurethanes to have good adhesion to other plastics, preferably polyamide and ABS.

It is further advantageous if low-thickness overmolding is possible.

It is therefore preferable to use thermoplastic polyurethane for the articles, in particular covers. There are some very different TPU types in existence, inter alia aliphatic TPU with high lightfastness and also transparent TPU.

Surfaces which have a so-called "soft touch" but do not appear tacky are particularly sought-after. This "soft touch" is often produced by surface textures which constitute preferred embodiments.

Use:

The polyurethane, preferably the thermoplastic polyurethane, is used for an article which is a constituent of a device that receives or transmits electromagnetic radiation or which at least partially covers this device or is used in proximity to the device, wherein the frequency of the electromagnetic radiation is between $10^4$ Hz and $10^{13}$ Hz, preferably between $10^5$ Hz and $10^{11}$ Hz and particularly preferably between $0.5 \times 10^9$ Hz and $3.0 \times 10^9$ Hz and very particularly preferably about 2 GHz.

Preference is given to the devices selected from the group of radios, radio equipment, televisions, remote controls, latching switches, cordless telephones, computers and tablets. A preferred article is the frame of one of the above-mentioned devices or a cover for one of these devices. More preferably concerned is the frame or a cover for a cordless telephone, a computer for a tablet.

Further embodiments of the present invention may be found in the claims and the examples. It will be appreciated that the features of the subject matter/process according to the invention or of the uses according to the invention recited hereinabove and elucidated hereinbelow may be used not only in the combination specified in each case but also in other combinations without departing from the scope of the invention. Thus, for example, the combination of a preferred feature with a particularly preferred feature or of a feature not characterized further with a particularly preferred feature etc. is also encompassed implicitly even if this combination is not mentioned explicitly.

Illustrative embodiments of the present invention are listed below, but these do not restrict the present invention. In particular, the present invention also encompasses those embodiments which result from the dependency references and hence combinations specified hereinafter.

1. Article made of polyurethane, preferably thermoplastic polyurethane, which is a constituent of a device or a cover for a device or which is used in proximity to a device, wherein the device receives or transmits electromagnetic radiation and the polyurethane is produced from at least one diisocyanate and at least one isocyanate-reactive substance having a number-average molecular weight of more than $0.500 \times 10^3$ g/mol, wherein the isocyanate-reactive substance comprises at least one polycarbonate having at least two hydroxyl groups.
2. Article according to the preceding embodiment, wherein the frequency of the electromagnetic radiation is between $10^4$ Hz and $10^{13}$ Hz, preferably between $10^5$ Hz and $10^{11}$ Hz and particularly preferably between $0.5 \times 10^9$ Hz and $3.0 \times 10^9$ Hz.
3. Article according to either of the preceding embodiments, wherein the polycarbonate is an aliphatic polycarbonate.
4. Article according to any of the preceding embodiments, wherein the polycarbonate is based on diols selected from the group of butanediol, pentanediol or hexanediol.
5. Article according to any of the preceding embodiments, wherein the diisocyanate is selected from the group of 4,4'-, 2,4'- and 2,2'-dicyclohexylmethane diisocyanate (H12 MDI), 1,6-hexamethylene diisocyanate (HDI), 1,4-cyclohexane diisocyanate, 1-methyl-2,4- and/or -2,6-cyclohexane diisocyanate, 2,2'-, 2,4'- and/or 4,4'-diphenylmethane diisocyanate (MDI), 2,4- and/or 2,6-tolylene diisocyanate (TDI) and is particularly preferably 1,6-hexamethylene diisocyanate (HDI) or 2,2'-, 2,4'- and/or 4,4'-diphenylmethane diisocyanate (MDI).
6. Article according to any of the preceding embodiments, wherein the polyurethane is a thermoplastic polyurethane.
7. Article according to the preceding embodiment, wherein production of the thermoplastic polyurethane further employs an aliphatic, araliphatic, aromatic or cycloaliphatic compound having isocyanate-reactive groups and a molecular weight between 0.05 g/mol and 0.499 g/mol as a chain extender, wherein the chain extender preferably has only primary hydroxyl groups.
8. Article according to either of embodiments 6 and 7, wherein production of the thermoplastic polyurethane employs an organic metal compound as the catalyst.
9. Article according to any of the preceding embodiments, wherein the article is a frame or a protective cover for the device.
10. Article according to any of the preceding embodiments, wherein the polyurethane contains inorganic fibrous fillers.
11. Article according to the preceding embodiment, wherein the inorganic fibers are coated glass fibers which are more preferably made of E-glass, more preferably have a thickness of 3 µm to 30 µm, in particular 8 µm to 15 µm, and more preferably have a maximum fiber length distribution in the range from 0.03 mm to about 15 mm, in particular from 1 mm to 10 mm.
12. Use of polyurethane, preferably of thermoplastic polyurethane, for an article according to any of the preceding embodiments.
13. Article made of a polyurethane, preferably a thermoplastic polyurethane, which is a constituent of a device or a cover for a device or which is used in proximity to a device, wherein the device receives or transmits electromagnetic radiation and the polyurethane is produced from at least one diisocyanate and at least one isocyanate-reactive substance having a number-average molecular weight of more than $0.500 \times 10^3$ g/mol, wherein the isocyanate-reactive substance comprises at least one polycarbonate having at least two hydroxyl groups.
14. Article according to embodiment 13, wherein the frequency of the electromagnetic radiation is between $10^4$ Hz and $10^{13}$ Hz, preferably between $10^5$ Hz and $10^{11}$ Hz and particularly preferably between $0.5 \times 10^9$ Hz and $3.0 \times 10^9$ Hz.
15. Article according to either of embodiments 13 and 14, wherein the polycarbonate is an aliphatic polycarbonate.
16. Article according to any of embodiments 13 to 15, wherein the polycarbonate is based on diols selected from the group consisting of butanediol, pentanediol and hexanediol.
17. Article according to any of embodiments 13 to 16, wherein the diisocyanate is selected from the group consisting of 4,4'-, 2,4'- and 2,2'-dicyclohexylmethane diisocyanate (H12 MDI), 1,6-hexamethylene diisocyanate (HDI), 1,4-cyclohexane diisocyanate, 1-methyl-2,4- and/or -2,6-cyclohexane diisocyanate, 2,2'-, 2,4'- and/or 4,4'-diphenylmethane diisocyanate (MDI), 2,4- and/or 2,6-tolylene diisocyanate (TDI).
18. Article according to any of embodiments 13 to 17, wherein the diisocyanate is selected from the group consisting of 1,6-hexamethylene diisocyanate (HDI) and 2,2'-, 2,4'- and/or 4,4'-diphenylmethane diisocyanate (MDI).
19. Article according to any of embodiments 13 to 18, wherein the polyurethane is a thermoplastic polyurethane.
20. Article according to embodiment 19, wherein production of the thermoplastic polyurethane further employs an aliphatic, araliphatic, aromatic or cycloaliphatic compound having isocyanate-reactive groups and a molecular weight between 0.05 g/mol and 0.499 g/mol as a chain extender, wherein the chain extender preferably has only primary hydroxyl groups.
21. Article according to either of embodiments 19 and 20, wherein production of the thermoplastic polyurethane employs an organic metal compound as the catalyst.
22. Article according to any of embodiments 13 to 21, wherein the article is a frame or a protective cover for the device.
23. Article according to any of embodiments 13 to 22, wherein the polyurethane contains inorganic fibrous fillers.
24. Article according to embodiment 23, wherein the inorganic fibers are coated glass fibers which are more preferably made of E-glass, more preferably have a thickness of 3 μm to 30 μm, in particular 8 μm to 15 μm, and more preferably have a maximum fiber length distribution in the range from 0.03 mm to about 15 mm, in particular from 1 mm to 10 mm.
25. Use of a polyurethane, preferably of a thermoplastic polyurethane, for an article according to any of embodiments 13 to 24.
26. Frame or protective cover for a device or which is used in proximity to a device, wherein the device receives or transmits electromagnetic radiation, consisting of a polyurethane which is produced from at least one diisocyanate and at least one isocyanate-reactive substance having a number-average molecular weight of more than $0.500 \times 10^3$ g/mol, wherein the isocyanate-reactive substance comprises at least one polycarbonate having at least two hydroxyl groups.
27. Frame or protective cover for a device according to embodiment 26, wherein the frequency of the electromagnetic radiation is between $10^4$ Hz and $10^{13}$ Hz, preferably between $10^5$ Hz and $10^{11}$ Hz and particularly preferably between $0.5 \times 10^9$ Hz and $3.0 \times 10^9$ Hz.
28. Frame or protective cover for a device according to either of embodiments 26 and 27, wherein the polycarbonate is an aliphatic polycarbonate.
29. Frame or protective cover for a device according to any of embodiments 26 to 28, wherein the polycarbonate is based on diols selected from the group consisting of butanediol, pentanediol and hexanediol.
30. Frame or protective cover for a device according to any of embodiments 26 to 29, wherein the diisocyanate is selected from the group consisting of 4,4'-, 2,4'- and 2,2'-dicyclohexylmethane diisocyanate (H12 MDI), 1,6-hexamethylene diisocyanate (HDI), 1,4-cyclohexane diisocyanate, 1-methyl-2,4- and/or -2,6-cyclohexane diisocyanate, 2,2'-, 2,4'- and/or 4,4'-diphenylmethane diisocyanate (MDI), 2,4- and/or 2,6-tolylene diisocyanate (TDI).
31. Frame or protective cover for a device according to any of embodiments 26 to 30, wherein the diisocyanate is selected from the group consisting of 1,6-hexamethylene diisocyanate (HDI) and 2,2'-, 2,4'- and/or 4,4'-diphenylmethane diisocyanate (MDI).
32. Frame or protective cover for a device according to any of embodiments 26 to 31, wherein the polyurethane is a thermoplastic polyurethane.
33. Frame or protective cover for a device according to embodiment 32, wherein production of the thermoplastic polyurethane further employs an aliphatic, araliphatic, aromatic or cycloaliphatic compound having isocyanate-reactive groups and a molecular weight between 0.05 g/mol and 0.499 g/mol as a chain extender, wherein the chain extender preferably has only primary hydroxyl groups.
34. Frame or protective cover for a device according to either of embodiments 32 and 33, wherein production of the thermoplastic polyurethane employs an organic metal compound as the catalyst.
35. Frame or protective cover for a device according to any of embodiments 26 to 34, wherein the polyurethane contains inorganic fibrous fillers.
36. Frame or protective cover for a device according to embodiment 35, wherein the inorganic fibers are coated glass fibers which are more preferably made of E-glass, more preferably have a thickness of 3 μm to 30 μm, in particular 8 μm to 15 μm, and more preferably have a maximum fiber length distribution in the range from 0.03 mm to about 15 mm, in particular from 1 mm to 10 mm.
37. Use of a polyurethane for producing an article which is a constituent of a device or a cover for a device or which is used in proximity to a device, wherein the device receives or transmits electromagnetic radiation and wherein the polyurethane is produced from at least one diisocyanate and at least one isocyanate-reactive substance having a number-average molecular weight of more than $0.500 \times 10^3$ g/mol, wherein the isocyanate-reactive substance comprises at least one polycarbonate having at least two hydroxyl groups.
38. Use according to embodiment 37, wherein the frequency of the electromagnetic radiation is between $10^4$ Hz and $10^{13}$ Hz, preferably between $10^5$ Hz and $10^{11}$ Hz and particularly preferably between $0.5 \times 10^9$ Hz and $3.0 \times 10^9$ Hz.
39. Use according to either of embodiments 37 and 38, wherein the polycarbonate is an aliphatic polycarbonate.

40. Use according to any of embodiments 37 to 39, wherein the polycarbonate is based on diols selected from the group consisting of butanediol, pentanediol and hexanediol.
41. Use according to any of embodiments 37 to 40, wherein the diisocyanate is selected from the group consisting of 4,4'-, 2,4'- and 2,2'-dicyclohexylmethane diisocyanate (H12 MDI), 1,6-hexamethylene diisocyanate (HDI), 1,4-cyclohexane diisocyanate, 1-methyl-2,4- and/or -2,6-cyclohexane diisocyanate, 2,2'-, 2,4'- and/or 4,4'-diphenylmethane diisocyanate (MDI), 2,4- and/or 2,6-tolylene diisocyanate (TDI).
42. Use according to any of embodiments 37 to 41, wherein the diisocyanate is selected from the group consisting of 1,6-hexamethylene diisocyanate (HDI) and 2,2'-, 2,4'- and/or 4,4'-diphenylmethane diisocyanate (MDI).
43. Use according to any of embodiments 37 to 42, wherein the polyurethane is a thermoplastic polyurethane.
44. Use according to embodiment 43, wherein production of the thermoplastic polyurethane further employs an aliphatic, araliphatic, aromatic or cycloaliphatic compound having isocyanate-reactive groups and a molecular weight between 0.05 g/mol and 0.499 g/mol as a chain extender, wherein the chain extender preferably has only primary hydroxyl groups.
45. Use according to either of embodiments 43 and 44, wherein production of the thermoplastic polyurethane employs an organic metal compound as the catalyst.
46. Use according to any of embodiments 37 to 45, wherein the polyurethane contains inorganic fibrous fillers.
47. Use according to embodiment 46, wherein the inorganic fibers are coated glass fibers which are more preferably made of E-glass, more preferably have a thickness of 3 μm to 30 μm, in particular 8 μm to 15 μm, and more preferably have a maximum fiber length distribution in the range from 0.03 mm to about 15 mm, in particular from 1 mm to 10 mm.
48. Use according to any of embodiments 37 to 47, wherein the article is a frame or a protective cover for the device.

The examples that follow serve to illustrate the invention, but are in no way intended to be limiting to the subject matter of the present invention.

EXAMPLES

1. Example 1—Production of the Polymers in Manual Casting Process

The polyols were initially charged in a container at 80° C. and mixed by vigorous stirring with the components according to the following TPU formulations in a batch size of 2 kg. The reaction mixture was heated to above 110° C. and was then poured out onto a heated, Teflon-coated table. The obtained casting was heat treated at 80° C. for 15 hours, subsequently comminuted and injection molded to afford injection molded sheets of 2 mm in thickness. The injection molding temperatures were varied in the range of 180° C.-220° C. depending on the respective melt viscosity.

2. Example 2—Materials Used for the Comparative Examples

TPU 1: TPU of Shore hardness 85 A from BASF Polyurethanes GmbH, Elastogranstrasse 60, 49448 Lemförde, based on polytetrahydrofuran (PTHF) having a molecular weight (Mn) of 1000 dalton, butane-1,4-diol, MDI.
TPU 2: TPU of Shore hardness 90 A from BASF Polyurethanes GmbH, Elastogranstrasse 60, 49448 Lemförde, based on polytetrahydrofuran (PTHF) having a molecular weight (Mn) of 1000 dalton, butane-1,4-diol, MDI.
TPU 3: TPU of Shore hardness 85 A from BASF Polyurethanes GmbH, Elastogranstrasse 60, 49448 Lemförde, based on polytetrahydrofuran (PTHF) having a molecular weight (Mn) of 1000 dalton, 1,2-ethylene glycol, HDI.
TPU 4: TPU of Shore hardness 90 A from BASF Polyurethanes GmbH, Elastogranstrasse 60, 49448 Lemförde, based on an adipic ester having a molecular weight (Mn) of 800 dalton, butane-1,4-diol, MDI.
TPU 5: TPU of Shore hardness 85 A from BASF Polyurethanes GmbH, Elastogranstrasse 60, 49448 Lemförde, based on an adipic ester having a molecular weight (Mn) of 1000 dalton, butane-1,4-diol, MDI.
TPU 6: TPU of Shore hardness 85 A from BASF Polyurethanes GmbH, Elastogranstrasse 60, 49448 Lemförde, based on an adipic ester having a molecular weight (Mn) of 2400 dalton, butane-1,4-diol, MDI.
TPU 7: TPU of Shore hardness 95 A from BASF Polyurethanes GmbH, Elastogranstrasse 60, 49448 Lemförde, based on an adipic ester having a molecular weight (Mn) of 2400 dalton, butane-1,4-diol, MDI.
TPU 8: TPU of Shore hardness 85 A from BASF Polyurethanes GmbH, Elastogranstrasse 60, 49448 Lemförde, based on an adipic ester having a molecular weight (Mn) of 2000 dalton, butane-1,4-diol, HDI.
TPU 9: TPU of Shore hardness 85 A from BASF Polyurethanes GmbH, Elastogranstrasse 60, 49448 Lemförde, based on Ultradur B4500, an adipic ester having a molecular weight (Mn) of 2000 dalton, butane-1,4-diol, HDI. Produced by the process described in EP0141918861.
TPU 10: TPU of Shore hardness 85 A from BASF Polyurethanes GmbH, Elastogranstrasse 60, 49448 Lemförde, based on Capromer PD 1-20 (polycaprolactone) having a molecular weight (Mn) of 2000 dalton, butane-1,4-diol, MDI.
TPU 11: TPU of Shore hardness 85 A from BASF Polyurethanes GmbH, Elastogranstrasse 60, 49448 Lemförde, based on Capromer PD 1-20 (polycaprolactone) having a molecular weight (Mn) of 2000 dalton, butane-1,4-diol, H12MDI.

3. Example 3—Inventive Examples

TPU 12: TPU of Shore hardness 95 A from BASF Polyurethanes GmbH, Elastogranstrasse 60, 49448 Lemförde, based on Ultradur B4500, a polycarbonate diol from Ube (Eternacoll PH-200D), butane-1,4-diol, HDI. Produced by the process described in EP0141918861.
TPU 13: TPU of Shore hardness 80 A from BASF Polyurethanes GmbH, Elastogranstrasse 60, 49448 Lemförde, based on a polycarbonate diol from Ube (Eternacoll PH-200D), butane-1,4-diol, HDI.
TPU 14: TPU of Shore hardness 80 A from BASF Polyurethanes GmbH, Elastogranstrasse 60, 49448 Lemförde, based on a polycarbonate diol from Bayer (Desmophen 2200), butane-1,4-diol, MDI.

TPU 15: TPU of Shore hardness 80 A from BASF Polyurethanes GmbH, Elastogranstrasse 60, 49448 Lemförde, based on a polycarbonate diol from Ube (Eternacoll PH-200D), butane-1,4-diol, MDI.

TPU 16: TPU of Shore hardness 90 A from BASF Polyurethanes GmbH, Elastogranstrasse 60, 49448 Lemförde, based on a polycarbonate diol from Ube (Eternacoll PH-200D), butane-1,4-diol, MDI.

TPU 17: TPU of Shore hardness 55D from BASF Polyurethanes GmbH, Elastogranstrasse 60, 49448 Lemförde, based on a polycarbonate diol from Ube (Eternacoll PH-200D), butane-1,4-diol, MDI.

TPU 18: TPU of Shore hardness 62D from BASF Polyurethanes GmbH, Elastogranstrasse 60, 49448 Lemförde, based on a polycarbonate diol from Ube (Eternacoll PH-200D), butane-1,4-diol, MDI.

TPU 19: TPU of Shore hardness 90 A from BASF Polyurethanes GmbH, Elastogranstrasse 60, 49448 Lemförde, based on a polycarbonate diol from Ube (Eternacoll PH-200D), butane-1,4-diol, H12MDI.

4. Example 4

The pellets of the abovementioned materials were melted and films of about 2 mm in thickness were produced to determine the dielectric loss factor. A low dielectric loss factor indicates a low attenuation of the incident signal strength.

After conditioning of 14 days under standard climatic conditions (23° C., 50% atmospheric humidity) 2 samples were in each case measured according to IEC 60250 under standard climatic conditions (23° C., 50% atmospheric humidity). The sample thickness was 2.0 mm.

The average values of the measurements are shown in the tables which follow.

TABLE 1 comparative examples

| Sample description | Frequency/ [MHz] | Dielectric constant/ ($\epsilon_r$) | Dielectric loss factor (tan δ) |
|---|---|---|---|
| TPU 1 | 500 | 3.7 | 0.098 |
| TPU 2 | 500 | 3.7 | 0.092 |
| TPU 3 | 500 | 4.2 | 0.148 |
| TPU 4 | 500 | 3.7 | 0.072 |
| TPU 5 | 500 | 3.9 | 0.089 |
| TPU 6 | 500 | 4.2 | 0.115 |
| TPU 7 | 500 | 3.7 | 0.076 |
| TPU 8 | 500 | 4.3 | 0.146 |
| TPU 9 | 500 | 3.9 | 0.102 |
| TPU 10 | 500 | 3.7 | 0.086 |
| TPU 11 | 500 | 3.4 | 0.069 |

TABLE 2 inventive examples

| Sample description | Frequency [MHz] | Dielectric constant ($\epsilon_r$) | Dielectric loss factor (tan δ) |
|---|---|---|---|
| TPU 12 | 400 | 2.9 | 0.017 |
| TPU 13 | 400 | 2.8 | 0.036 |
| TPU 14 | 400 | 2.9 | 0.023 |
| TPU 15 | 400 | 2.9 | 0.022 |
| TPU 16 | 400 | 2.9 | 0.018 |
| TPU 16 | 500 | 2.9 | 0.015 |
| TPU 17 | 400 | 2.9 | 0.016 |
| TPU 18 | 400 | 2.9 | 0.015 |
| TPU 19 | 400 | 2.8 | 0.019 |

It is apparent that the dielectric loss factor is markedly lower for the polyurethanes based on polycarbonate than for the types lacking polycarbonate diol.

CITED LITERATURE

"Kunststoffhandbuch", volume 7, "Polyurethane", Carl Hanser Verlag, 3rd edition 1993, chapter 5

"Kunststoffhandbuch", volume 7, "Polyurethane", Carl Hanser Verlag, 3rd edition 1993, chapter 6

Polyurethane Handbook, Hanser, Munich, 1993, chapter 3.2 and chapter 3.4 and chapter 6.1

"Kunststoffhandbuch", volume 7, "Polyurethane", Carl Hanser Verlag, 3rd edition 1993 chapter 3.1

Glass Fibers, Frederick T. Wallenberger, James C. Watson, and Hong Li, PPG Industries, Inc.; ASM Handbook, Vol. 21: Composites Plastics Additives Handbook, 5th edition, H. Zweifel, ed., Hanser, Munich, 2001, pp. 98-136

EP 0989146 A1

EP 1460094 A1

PCT/EP2005/010124

EP 1529792 A1

The invention claimed is:

1. An article, made of a thermoplastic polyurethane, and which is a constituent of a device or a cover for the device or which is used in proximity to the device,
   wherein the device receives or transmits electromagnetic radiation and the thermoplastic polyurethane is produced from at least one diisocyanate as component (a) and at least one isocyanate-reactive substance having a number-average molecular weight of more than 0.500× $10^3$ g/mol as component (b) and a chain extender (c) having a number-average molecular weight between 50 g/mol and 499 g/mol,
   wherein the at least one isocyanate-reactive substance comprises at least one polycarbonate having at least two hydroxyl groups,
   wherein the frequency of the electromagnetic radiation is between $10^4$ Hz and $10^{13}$ Hz,
   wherein the at least one polycarbonate is based on an aliphatic polycarbonate and is based on starting materials comprising diols selected from the group consisting of butanediol, pentanediol, and hexanediol, and
   wherein the at least one diisocyanate is selected from the group consisting of 4,4'-, 2,4'- and 2,2'-dicyclohexylmethane diisocyanate (H12MDI), 1,4-cyclohexane diisocyanate, 1-methyl-2,4- and/or -2,6-cyclohexane diisocyanate, 2,2'-, 2,4'- and/or 4,4'-diphenylmethane diisocyanate (MDI), and 2,4- and/or 2,6-tolylene diisocyanate (TDI).

2. The article of claim 1, wherein the at least one diisocyanate is selected from the group consisting of 2,2'-, 2,4'- and/or 4,4'-diphenylmethane diisocyanate (MDI).

3. The article of claim 1, wherein the production of the thermoplastic polyurethane further employs an aliphatic, araliphatic, aromatic or cycloaliphatic compound having isocyanate-reactive groups and a molecular weight between 50 g/mol and 499 g/mol as the chain extender.

4. The article of claim 3, wherein the production of the thermoplastic polyurethane employs an organic metal compound as a catalyst.

5. The article of claim 1, wherein the article is a frame or a protective cover for the device.

6. The article of claim 1, wherein the thermoplastic polyurethane comprises an inorganic fibrous filler.

7. The article of claim 6, wherein the inorganic fibrous filler is a coated glass fiber.

8. A process of producing an article which is a constituent of a device or a cover for the device or which is used in proximity to the device, the process comprising obtaining a thermoplastic polyurethane,
wherein the device receives or transmits electromagnetic radiation and the thermoplastic polyurethane is produced from at least one diisocyanate as component (a) and at least one isocyanate-reactive substance having a number-average molecular weight of more than $0.500 \times 10^3$ g/mol as component (b) and a chain extender (c) having a number-average molecular weight between 50 g/mol and 499 g/mol,
wherein the at least one isocyanate-reactive substance comprises at least one polycarbonate having at least two hydroxyl groups,
wherein the frequency of the electromagnetic radiation is between $10^4$ Hz and $10^{13}$ Hz,
wherein the at least one polycarbonate is an aliphatic polycarbonate and is based on diols as starting materials selected from the group consisting of butanediol, pentanediol and hexanediol, and
wherein the at least one diisocyanate is selected from the group consisting of 4,4'-, 2,4'- and 2,2'-dicyclohexylmethane diisocyanate (H12MDI), 1,4-cyclohexane diisocyanate, 1-methyl-2,4- and/or -2,6-cyclohexane diisocyanate, 2,2'-, 2,4'- and/or 4,4'-diphenylmethane diisocyanate (MDI), and 2,4- and/or 2,6-tolylene diisocyanate (TDI).

9. The article of claim 1, wherein the article is a frame for the device.

10. The article of claim 1, wherein the thermoplastic polyurethane comprises coated glass fibers having a thickness of 8 to 15 microns and a maximum fiber length distribution from 1 mm to 10 mm.

11. The article of claim 2, wherein the at least one polycarbonate is based on butane-1,4-diol as a starting material.

12. The article of claim 1, wherein the thermoplastic polyurethane has a dielectric loss factor of 0.015 to 0.036.

13. The article of claim 1, wherein the thermoplastic polyurethane has a hardness range of 30 Shore A to 80 Shore D.

14. The article of claim 1, wherein the thermoplastic polyurethane has a weight-average molecular weight of 80,000 to 800,000 g/mol.

15. The article of claim 1, wherein the thermoplastic polyurethane comprises 10% to 50% by weight of inorganic fibrous filler.

16. The process of claim 8, wherein the thermoplastic polyurethane comprises an inorganic fibrous filler.

17. The article of claim 1, wherein the at least one polycarbonate is an aliphatic polycarbonate and is formed from diols as starting materials that consists of 1,4-butanediol.

18. The article of claim 1, wherein the isocyanate-reactive substance comprises more than 95% by weight of the aliphatic polycarbonate.

19. An article, made of a thermoplastic polyurethane, and which is a constituent of a device or a cover for the device or which is used in proximity to the device,
wherein the device receives or transmits electromagnetic radiation, and the thermoplastic polyurethane is produced from at least one diisocyanate as component (a) and at least one isocyanate-reactive substance having a number-average molecular weight of more than $0.500 \times 10^3$ g/mol as component (b) and a chain extender (c) having a number-average molecular weight between 50 g/mol and 499 g/mol,
wherein the at least one isocyanate-reactive substance comprises at least one polycarbonate having at least two hydroxyl groups,
wherein the frequency of the electromagnetic radiation is between $10^4$ Hz and $10^{13}$ Hz
wherein the at least one polycarbonate is based on an aliphatic polycarbonate and is based on starting materials comprising diols selected from the group consisting of butanediol and pentanediol.

* * * * *